(12) United States Patent
Fujii et al.

(10) Patent No.: US 10,400,120 B2
(45) Date of Patent: *Sep. 3, 2019

(54) INK, INK CONTAINER, AND INKJET RECORDING APPARATUS

(71) Applicant: Ricoh Company, Ltd., Tokyo (JP)

(72) Inventors: Hidetoshi Fujii, Kanagawa (JP); Amika Sagara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,804

(22) Filed: Jun. 5, 2018

(65) Prior Publication Data

US 2018/0282558 A1   Oct. 4, 2018

Related U.S. Application Data

(63) Continuation of application No. 15/208,074, filed on Jul. 12, 2016, now Pat. No. 10,125,279.

(30) Foreign Application Priority Data

Jul. 27, 2015 (JP) .................................. 2015-147564
Sep. 10, 2015 (JP) .................................. 2015-178241

(51) Int. Cl.
C09D 11/102 (2014.01)
B41J 2/175 (2006.01)
C09D 11/322 (2014.01)

(52) U.S. Cl.
CPC .......... *C09D 11/102* (2013.01); *B41J 2/1752* (2013.01); *B41J 2/17503* (2013.01); *B41J 2/17509* (2013.01); *B41J 2/17513* (2013.01); *C09D 11/322* (2013.01); *B41J 2002/17516* (2013.01)

(58) Field of Classification Search
CPC ... C09D 11/40; C09D 11/38; B29D 11/00865; B41M 5/0023
See application file for complete search history.

(56) References Cited

U.S. PATENT DOCUMENTS

2005/0257717 A1   11/2005   Knott
2008/0022887 A1    1/2008   Tanoue
2009/0182098 A1    7/2009   Sano
2009/0191391 A1    7/2009   Naito
(Continued)

FOREIGN PATENT DOCUMENTS

JP   54-059936   5/1979
JP   56-064877   6/1981
(Continued)

OTHER PUBLICATIONS http://www.chemicalland21.com/industrialchem/solalc/3-METHOXY-1-PROPANOL.htm retrieved Jan. 6, 2017.
(Continued)

*Primary Examiner* — John Zimmermann
(74) *Attorney, Agent, or Firm* — Oblon, McClelland, Maier & Neustadt, L.L.P.

(57) ABSTRACT

An ink including an organic solvent, a pigment, a polyurethane particle, and water is provided. The organic solvent includes at least one of 3-methoxy-1-butanol and 3-methoxy-1-propanol. The polyurethane particle has a particle diameter D50 of 50 nm or less.

14 Claims, 4 Drawing Sheets

(56) References Cited

U.S. PATENT DOCUMENTS

| | | | |
|---|---|---|---|
| 2011/0069118 A1* | 3/2011 | Ohzeki | B41J 2/14233 |
| | | | 347/44 |
| 2011/0216122 A1* | 9/2011 | Maruyama | B41J 2/015 |
| | | | 347/20 |
| 2011/0217468 A1* | 9/2011 | Maruyama | B05D 5/00 |
| | | | 427/256 |
| 2012/0320137 A1 | 12/2012 | Fujii et al. | |
| 2013/0052434 A1 | 2/2013 | Asahi | |
| 2013/0065028 A1 | 3/2013 | Fujii | |
| 2013/0101814 A1 | 4/2013 | Gotou et al. | |
| 2013/0143008 A1 | 6/2013 | Gotou et al. | |
| 2013/0197144 A1 | 8/2013 | Katoh et al. | |
| 2013/0258005 A1 | 10/2013 | Hasegawa | |
| 2014/0198160 A1 | 7/2014 | Harada et al. | |
| 2015/0030818 A1 | 1/2015 | Fujii et al. | |
| 2015/0079358 A1 | 3/2015 | Gotou et al. | |
| 2017/0022381 A1 | 1/2017 | Takamura | |

FOREIGN PATENT DOCUMENTS

| | | |
|---|---|---|
| JP | 6-071882 | 3/1994 |
| JP | 2007-177160 | 7/2007 |
| JP | 2008-222905 | 9/2008 |
| JP | 2012-077188 | 4/2012 |
| JP | 2013-108022 | 6/2013 |
| JP | 2013-155322 | 8/2013 |
| JP | 2015-042732 | 3/2015 |

OTHER PUBLICATIONS http://www.chemicalland21.com/industrialchem/solalc/3-METHOXY-1-BUTANOL.htm retrieved Jan. 6, 2017.

* cited by examiner

INK, INK CONTAINER, AND INKJET RECORDING APPARATUS

CROSS-REFERENCE TO RELATED APPLICATIONS

This patent application is a continuation of U.S. application Ser. No. 15/208,074, filed Jul. 12, 2016, and is based on and claims priority pursuant to 35 U.S.C. § 119(a) to Japanese Patent Application Nos. 2015-147564 and 2015-178241, filed on Jul. 27, 2015, and Sep. 10, 2015, respectively, in the Japan Patent Office, the entire disclosure of each of which is hereby incorporated by reference herein.

BACKGROUND

Technical Field

The present disclosure relates to an ink, an ink container, and an inkjet recording apparatus.

Description of the Related Art

Inkjet recording process is generally simpler than other recording processes. It is generally easy to provide a simple high-resolution full-color image forming apparatus employing inkjet recording process. As inks used for inkjet recording process (hereinafter "inkjet inks"), dye inks are widely used, in which a water-soluble dye is dissolved in water or a mixture liquid of water and a water-soluble humectant.

On the other hand, aqueous pigment inks (hereinafter simply "pigment inks") in which fine particles of a water-dispersible pigment are dispersed in water are attracting attention, in accordance with increasing needs of high-speed image forming apparatuses. It is known that such inkjet inks using a water-dispersible pigment have excellent water resistance and light resistance. However, when an image is recorded with such a pigment ink on glossy paper, the pigment in the ink remains on the surface of the glossy paper forming its film without permeating the ink receiving layer of the glossy paper. The image thus recorded with a pigment ink on glossy paper is generally inferior in terms of rub resistance than that recorded with a pigment ink on plain paper or with a dye ink that can permeate the ink receiving layer. As the image recorded with a pigment ink on glossy paper is rubbed, the ink film will be peeled off and stretched over non-printed parts and the rubbed surface will be fouled.

SUMMARY

In accordance with some embodiments of the present invention, an ink is provided. The ink includes an organic solvent, a pigment, a polyurethane particle, and water. The organic solvent includes at least one of 3-methoxy-1-butanol and 3-methoxy-1-propanol. The polyurethane particle has a particle diameter D50 of 50 nm or less.

In accordance with some embodiments of the present invention, an ink container is provided. The ink container includes a container and the above ink contained in the container.

In accordance with some embodiments of the present invention, an inkjet recording apparatus is provided. The inkjet recording apparatus includes the above ink container and a recording head to discharge the ink.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
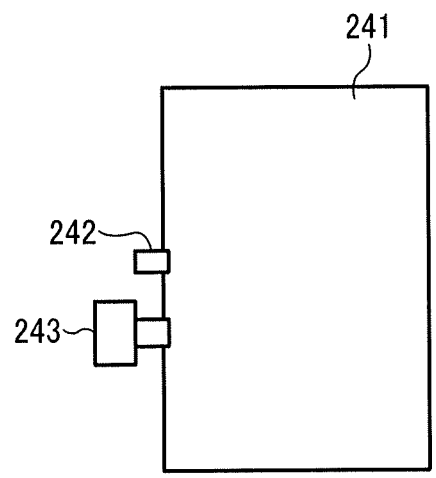
FIG. 1 is a schematic view of an ink bag according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In accordance with some embodiments of the present invention, an ink having improved rub resistance and excellent storage stability is provided.

An ink according to an embodiment of the present invention includes an organic solvent, a pigment, a polyurethane particle, and water. The organic solvent includes at least one of 3-methoxy-1-butanol and 3-methoxy-1-propanol. The polyurethane particle has a particle diameter D50 of 50 nm or less.

The combined use of the pigment and the polyurethane particle having a particle diameter D50 of 50 nm or less improves rub resistance of an image formed with the ink. The polyurethane particle having a small particle diameter acts as an adhesive between the pigment particles. Thus, in the image formed with the ink on a medium, the pigment particles are less likely to release from the medium even when being rubbed.

The particle diameter D50 of the polyurethane particle can be measured with, for example, a particle size distribution analyzer (NANOTRAC UPA-EX150 available from Nikkiso Co., Ltd.).

It is known that an ink including a polyurethane particle is likely to express a lower viscosity when stored. Specifically, when the polyurethane particle in the ink has a particle diameter D50 of 30 nm or less, the degree of viscosity decrease becomes much greater. A possible reason for this phenomenon is that as the specific surface area of the polyurethane particle becomes large, the polyurethane particle becomes more frequently attacked by the solvent. In particular, when the particle diameter D50 is 10 nm or less, the polyurethane particle will be dissolved in the solvent and no more exist in the form of a particle. The dissolved polyurethane will flow on the medium along with the solvent without improving fixing strength of the image. The dissolved polyurethane also increases the viscosity of the solvent in a rapid manner, thus increasing the initial viscosity of the ink.

The inventors of the present invention have found that the viscosity decrease of the conventional ink occurs when the ink is stored because the organic solvent gradually comes into between the polyurethane molecules. The inventors of the present invention have also found that when the organic solvent includes at least one of 3-methoxy-1-butanol and 3-methoxy-1-propanol, the organic solvent can come into between the polyurethane resin molecules in a shorter time, thus bringing the ink into a stable state without causing viscosity decrease or increase.

Preferably, 3-methoxy-1-butanol and/or 3-methoxy-1-propanol account(s) for 0.8% to 12% by mass of the ink, more preferably, 2% to 9% by mass of the ink. When the content rate of 3-methoxy-1-butanol and/or 3-methoxy-1-propanol in the ink ranges from 0.8% to 12% by mass, the occurrence of viscosity decrease is sufficiently suppressed when the ink is stored.

In a case in which 3-methoxy-1-butanol and 3-methoxy-1-propanol are used in combination, the total content rate thereof preferably ranges from 0.8% to 12% by mass.

In addition, it is preferable that the mass ratio of the 3-methoxy-1-butanol and/or 3-methoxy-1-propanol to the polyurethane particle ranges from 0.2 to 5.0. When the mass ratio is in the range of from 0.2 to 5.0, the ink expresses good discharge stability. It is more preferable that the mass ratio of the 3-methoxy-1-butanol and/or 3-methoxy-1-propanol to the polyurethane particle ranges from 0.5 to 4.

The polyurethane particle has a particle diameter D50 of 50 nm or less, as described above. More preferably, the polyurethane particle has a particle diameter D50 of from 10 to 30 nm.

Ink

Compositional materials of the ink (e.g., organic solvent, water, pigment, resin, other additives) are described in detail below.

Organic Solvent

In accordance with some embodiments of the present invention, the organic solvent includes at least one of 3-methoxy-1-butanol and 3-methoxy-1-propanol. In addition to 3-methoxy-1-butanol and/or 3-methoxy-1-propanol, the ink may further include another water-soluble organic solvent. Usable water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols (e.g., ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, 3-methyl-1,3,5-pentanetriol), polyol alkyl ethers (e.g., ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether), polyol aryl ethers (e.g., ethylene glycol monophenyl ether, ethylene glycol monobenzyl ether), nitrogen-containing heterocyclic compounds (e.g., 2-pyrrolidone, N-methyl-2-pyrrolidone, N-hydroxyethyl-2-pyrrolidone, 1,3-dimethyl-2-imidazolidinone, ε-caprolactam, γ-butyrolactone), amides (e.g., formamide, N-methylformamide, N,N-dimethylformamide, 3-methoxy-N,N-dimethyl propionamide, 3-butoxy-N,N-dimethylpropionamide), amines (e.g., monoethanolamine, diethanolamine, triethylamine), sulfur-containing compounds (e.g., dimethylsulfoxide, sulfolane, thiodiethanol), propylene carbonates, and ethylene carbonates.

Organic solvents having a boiling point of 250° C. or less are preferable since they function as a wetting agent while providing good drying property.

In addition, polyol compounds having 8 or more carbon atoms and glycol ether compounds are also preferable. Specific examples of polyol compounds having 8 or more carbon atoms include, but are not limited to, 2-ethyl-1,3-hexanediol and 2,2,4-trimethyl-1,3-pentanediol.

Specific examples of glycol ether compounds include, but are not limited to, polyol alkyl ethers (e.g., ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether) and polyol aryl ethers (e.g., ethylene glycol monophenyl ether, ethylene glycol monobenzyl ether).

The polyol compounds having 8 or more carbon atoms and the glycol ether compounds are capable of improving paper-permeability of the ink, which is advantageous when the ink is printed on a recording medium made of paper.

The content rate of the organic solvent in the ink is preferably in the range of from 10% to 60% by mass, more preferably from 20% to 60% by mass, from the aspects of ink drying property and discharge reliability, but is not limited thereto.

Water

The content rate of the water in the ink is preferably in the range of from 10% to 90% by mass, more preferably from 20% to 60% by mass, from the aspects of ink drying property and discharge reliability, but is not limited thereto.

Pigment

Usable pigments include both inorganic pigments and organic pigments. One pigment can be used alone, or two or more pigments can be used in combination. Mixed crystal pigments can also be used.

Usable pigments include black pigments, yellow pigments, magenta pigments, cyan pigments, white pigments, green pigments, orange pigments, glossy color pigments (e.g., gold pigments, silver pigments), and metallic pigments.

Specific examples of inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for solvents are preferable. In addition, resin hollow particles and inorganic hollow particles can also be used.

Specific examples of pigments used for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3, 15:4 (phthalocyanine blue), 16, 17:1, 56, 60, and 63; and C.I. Pigment Green 1, 4, 7, 8, 10, 17, 18, and 36.

The content rate of the pigment in the ink is preferably in the range of from 0.1% to 15% by mass, more preferably from 1% to 10% by mass, from the aspects of image density, fixing strength, and discharge stability.

The pigment can be dispersed in the ink by one of the following methods: a first method in which a hydrophilic functional group is introduced to the pigment to make the pigment self-dispersible; a second method in which the surface of the pigment gets covered with a resin; and a third method in which the pigment gets dispersed by a dispersant.

In the first method, for example, a functional group such as sulfone group and carboxyl group may be introduced to the pigment (e.g., carbon black) to make the pigment self-dispersible in water.

In the second method, for example, the pigment may get incorporated in a microcapsule so that the pigment becomes self-dispersible in water. In this case, the pigment may be restated as a resin-covered pigment. Not all the pigment particles included in the ink should be covered with a resin. It is possible that a part of the pigment particles are not covered with any resin or partially covered with a resin.

In the third method, for example, low-molecular dispersants and high-molecular dispersants, represented by known surfactants, may be used.

More specifically, any of anionic surfactants, cationic surfactants, ampholytic surfactants, and nonionic surfactants may be selected depending on the property of the pigment.

For example, a nonionic surfactant RT-100 (product of Takemoto Oil & Fat Co., Ltd.) and sodium naphthalenesulfonate formalin condensate are preferably used as the dispersant. One dispersant can be used alone, and two or more dispersants can be used in combination.

Pigment Dispersion

The ink can be obtained by mixing the pigment with other materials such as water and the organic solvent. The ink can also be obtained by, preparing a pigment dispersion by mixing the pigment with water, a pigment dispersant, etc. first, and then mixing the pigment dispersion with other materials such as water and the organic solvent.

The pigment dispersion includes water, the pigment, the pigment dispersant, and other components, if any. The pigment is dispersed in the pigment dispersion with the adjusted particle diameter. The pigment dispersion is preferably prepared using a disperser.

Preferably, the pigment dispersed in the pigment dispersion has a maximum frequency particle diameter in the range of from 200 to 500 nm, more preferably from 20 to 150 nm, based on the number of pigment particles, from the aspects of dispersion stability of the pigment and discharge stability and image quality (e.g., image density) of the ink. The particle diameter of the pigment can be measured with, for example, a particle size distribution analyzer (NANO-TRAC WAVE-UT151 available from MicrotracBEL Corp.).

The content rate of the pigment in the pigment dispersion is preferably in the range of from 0.1% to 50% by mass, more preferably from 0.1% to 30% by mass, from the aspects of discharge stability and image density, but is not limited thereto.

The pigment dispersion may be preferably subjected to filtration using a filter or a centrifugal separator to remove coarse particles and then degassing.

Polyurethane Particle

The ink includes a polyurethane particle for the purpose of improving rub resistance of the resulting image and storage stability of the ink containing the pigment.

The polyurethane is obtainable by polymerizing a polyisocyanate with a polyether polyol, a polyester polyol, a polylactone polyol, and/or a polycarbonate polyol. Specific examples of the polyisocyanate include, but are not limited to, aliphatic diisocyanate compounds (e.g., hexamethylene diisocyanate, 2,2,4-trimethylhexamethylene diisocyanate), alicyclic diisocyanate compounds (e.g., isophorone diisocyanate, hydrogenated xylylene diisocyanate, 1,4-cyclohexane diisocyanate, 4,4'-dicyclohexylmethane diisocyanate), aromatic aliphatic diisocyanate compounds (e.g., xylylene diisocyanate, tetramethylxylylene diisocyanate), aromatic diisocyanate compounds (e.g., tolylene diisocyanate, phenylmethane diisocyanate), and modified products of these diisocyanate compounds (e.g., carbodiimide, uretdione, uretonimine-containing modified products.)

Specific examples of the polyether polyol include, but are not limited to, polyethylene glycol, polypropylene glycol, polytetramethylene ether glycol, and polyhexamethylene ether glycol.

Specific examples of the polyester polyol include, but are not limited to, polyethylene adipate, polybutylene adipate, polyneopentyl adipate, poly-3-methylpentyl adipate, polyethylene/butylene adipate, polyneopentyl/hexyl adipate.

Specific examples of the polylactone polyol include, but are not limited to, polycaprolactone diol, poly-omega-hydroxycaproic acid polyol.

Specific examples of the polycarbonate polyol include, but are not limited to, reaction products of diols (e.g., propanediol-(1,3), butanediol-(1,4), hexanediol-(1,6), diethylene glycol, triethylene glycol, tetraethylene glycol), phosgene, and diaryl carbonates (e.g., diphenyl carbonate) or cyclic carbonates (e.g., ethylene carbonate, propylene carbonate).

The content rate of the polyurethane particle in the ink is preferably in the range of from 0.5% to 5% by mass, more preferably from 1% to 3% by mass, from the aspects of fixing strength and ink storage stability, but is not limited thereto.

The polyurethane resin can express much improved water dispersibility in an emulsion as an ionic group is introduced thereto. Specific examples of the ionic group include, but are not limited to: sulfonic acid group, carboxylic acid group, sulfuric acid group, phosphonic acid group, and phosphinic acid group; and alkali metal salt group, alkali earth metal salt group, ammonium salt group, and first to third amine group of the above acids. In particular, carboxylic acid alkali metal salt group, carboxylic acid ammonium salt group, sulfonic acid alkali metal salt group, and sulfonic acid ammonium salt group are preferable. From the aspect of water dispersion stability, sulfonic acid alkali metal salt group and sulfonic acid ammonium salt group are preferable. Introduction of the ionic group to the resin may be performed by adding a monomer having the ionic group at the time when the resin is being synthesized. The metal salt is preferably Li, K, or Na salt.

Surfactant

Usable surfactants include silicone-based surfactants, fluorine-based surfactants, ampholytic surfactants, nonionic surfactants, and anionic surfactants.

Specific examples of the silicone-based surfactants include those indecomposable at high pH, such as side-chain-modified polydimethylsiloxane, both-terminals-modified polydimethylsiloxane, one-terminal-modified polydimethylsiloxane, and side-chain-and-both-terminals-modified polydimethylsiloxane. More specifically, those having polyoxyethylene group and/or polyoxyethylene polyoxypropylene group as the modifying group are more preferable since they exhibit good properties as an aqueous surfactant. Specific examples of the silicone-based surfactants further include polyether-modified silicone-based surfactants, such as a dimethyl siloxane having a polyalkylene oxide structure on its side chain bonded to Si atom.

Specific examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain, which have weak foaming property. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-terminals-modified polydimethylsiloxane, one-terminal-modified polydimethylsiloxane, and side-chain-and-both-terminals-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

These surfactants are available either synthetically or commercially. Commercial products are readily available from BYK Japan KK, Shin-Etsu Chemical Co., Ltd., Dow Corning Toray Co., Ltd., Nihon Emulsion Co., Ltd., and Kyoeisha Chemical Co., Ltd. Specific examples of the polyether-modified silicone-based surfactants include, but are not limited to, a compound represented by the following formula (S-1) that is a dimethylpolysiloxane having a polyalkylene oxide structure on its side chain bonded to Si atom.

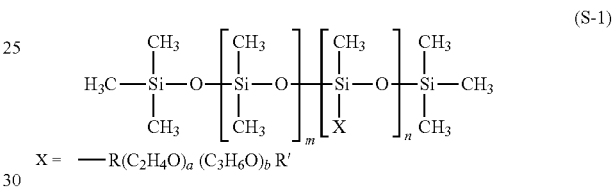

In the formula (S-1), each of m, n, a, and b independently represents an integer, and R and R' independently represents an alkyl group or an alkylene group.

Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd; BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain. Among these fluorine-based surfactants, polyoxyalkylene ether polymer compounds having a perfluoroalkyl ether group on its side chain is preferable since foaming property thereof is small. More specifically, compounds represented by the following formula (F-1) and (F-2) are preferable.

In the formula (F-1), to have water-solubility, m is preferably an integer of from 0 to 10, and n is preferably an integer of from 0 to 40.

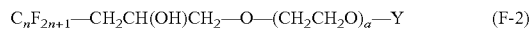

In the formula (F-2), Y represents H, $C_nF_{2n+1}$ (wherein n represents an integer of from 1 to 6), $CH_2CH(OH)CH_2$—

$C_nF_{2n+1}$ (wherein n represents an integer of from 4 to 6), or $C_pF_{2p+1}$ (wherein p represents an integer of from 1 to 19 and n represents an integer of from 1 to 6); and a represents an integer of from 4 to 14.

The fluorine-based surfactants are available either synthetically or commercially.

Specific examples of commercially-available fluorine-based surfactants include, but are not limited to: SURFLON S-111, S-112, S-113, S-121, S-131, S-132, S-141, and S-145 (available from AGC Seimi Chemical Co., Ltd.); Fluorad™ FC-93, FC-95, FC-98, FC-129, FC-135, FC-170C, FC-430, and FC-431 (available from 3M); MEGAFACE F-470, F-1405, and F-474 (available from DIC Corporation); Zonyl® TBS, FSP, FSA, FSN-100, FSN, FSO-100, FSO, FS-300, and UR (available from E. I. du Pont de Nemours and Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.).

Among these surfactants, FS-300 (available from E. I. du Pont de Nemours and Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are preferable since they can drastically improve print quality, particularly color developing property, and permeability, wettability, and level dying property for paper.

The content rate of the surfactant in the ink is preferably in the range of from 0.001% to 5% by mass, more preferably from 0.05% to 5% by mass, from the aspects of wettability, discharge stability, and image quality, but is not limited thereto.

The ink may further include other additives, such as a pH adjuster, an antiseptic antifungal agent, an antirust, and a chelate reagent.

The pH adjuster is capable of keeping the ink alkaline to stabilize the dispersion state of the ink, thereby stabilizing discharge property of the ink. When the pH is 11 or above, inkjet heads and/or ink supply units may be dissolved out in large amounts, thereby causing alternation, leakage, and defective discharge of the ink after a long-term use, depending on the material of the heads and/or units. In preparing the pigment dispersion, a pH adjuster is preferably kneaded with or dispersed in water together with the pigment and a dispersant, rather than added together with other additives (e.g., a moisturizer, a penetrant) after the kneading or dispersing of the pigment with/in water. This is because some pH adjusters may destroy a stabilized dispersion state.

The pH adjuster preferably includes at least one of an alcohol amine, an alkali metal hydroxide, an ammonium hydroxide, a phosphonium hydroxide, and an alkali metal carbonate.

Specific examples of the alcohol amine include, but are not limited to, diethanolamine, triethanolamine, and 2-amino-2-ethyl-1,3-propanediol. Specific examples of the alkali metal hydroxide include, but are not limited to, lithium hydroxide, sodium hydroxide, and potassium hydroxide. Specific examples of the ammonium hydroxide include, but are not limited to, ammonium hydroxide and quaternary ammonium hydroxide. Specific examples of the phosphonium hydroxide include, but are not limited to, quaternary phosphonium hydroxide. Specific examples of the alkali metal carbonate include, but are not limited to, lithium carbonate, sodium carbonate, and potassium carbonate.

Specific examples of the antiseptic antifungal agent include, but are not limited to, sodium dehydroacetate, sodium sorbate, 2-pyridinethiol-1-oxide sodium, sodium benzoate, and pentachlorophenol sodium.

Specific examples of the antirust include, but are not limited to, acid sulphite, sodium thiosulfate, ammonium thiodiglycolate, diisopropylammonium nitrite, pentaerythritol tetranitrate, and dicyclohexlyammonium nitrite.

Specific examples of the chelate reagent include, but are not limited to, ethylenediaminetetraacetic acid tetrasodium salt, nitrilotriacetic acid trisodium salt, hydroxyethylethylenediaminetriacetic acid trisodium salt, diethylenetriaminepentaacetic acid pentasodium salt, and uramildiacetic acid disodium salt.

The ink is produced by dispersing or dissolving ink components, including optional components such as a penetrant and a water-dispersible resin, in an aqueous medium, and further stirring and mixing them, if needed. The dispersing may be performed by a sand mill, homogenizer, ball mill, paint shaker, ultrasonic disperser. The stirring and mixing may be performed by a stirrer equipped with stirring blades, magnetic stirrer, or high-speed disperser.

The ink is not limited in properties such as viscosity and surface tension.

Preferably, the ink has a viscosity in the range of from 5 to 15 mPa·s at 25° C. When the ink viscosity is 5 mPa·s or more, print density and text quality are improved. When the ink viscosity is 15 mPa·s or less, discharge stability is secured.

The viscosity can be measured by a viscometer (e.g., RE-550L available from Toki Sangyo Co., Ltd.) at 25° C.

Preferably, the ink has a surface tension of 35 mN/m or less, more preferably 32 mN/m or less, at 25° C. When the surface tension is 35 mN/m or less, the leveling property of the ink on a recording medium is improved.

The ink is not limited in color, and may have any color such as yellow, magenta, cyan, and black. An ink set including two or more inks having different colors can form multi-color images. An ink set including inks having yellow, magenta, cyan, and black colors can form full-color images.

The ink may be preferably used for a printer including an inkjet head of any of the following types: a piezo type inkjet head in which a piezoelectric element, serving as a pressure generator for pressurizing ink in an ink flow path, deforms a vibration plate forming a wall surface of the ink flow path to vary the inner volume of the ink flow path to discharge droplets of the ink (as described in Japanese Examined Patent Application Publication No. 02-51734, corresponding to Japanese Unexamined Patent Application Publication No. 56-064877); a thermal type inkjet head in which a heat element heats an ink in an ink flow path to generate bubbles (as described in Japanese Examined Patent Application Publication No. 61-59911, corresponding to Japanese Unexamined Patent Application Publication No. 54-059936); and an electrostatic type inkjet head in which a vibration plate forming a wall surface of an ink flow path and an electrode are facing each other and an electrostatic force generated between the vibration plate and the electrode deforms the vibration plate to vary the inner volume of the ink flow path to discharge droplets of the ink (as described in Japanese Unexamined Patent Application Publication No. 06-71882).

The ink may be preferably used for inkjet inks, ball-point pens, fountain pens, marker pens, and felt pens. In particular, the ink is preferably used for inkjet image forming apparatuses (e.g., printers). As an example, the ink may be used for a printer in which a recording medium and an ink are heated to 50° C. to 200° C. at the time of, or immediately before or after, printing of an image with the ink, to accelerate fixing of the ink on the recording medium. The ink may also be used for an ink container, an inkjet recording apparatus, and an ink recorded matter, as described below.

Recording Medium

As the recording medium, glossy coated papers composed of a photographic paper base and a coated layer is preferably used. In addition, plain papers having no coated layer are also preferably used. As an example, plain paper having a degree of sizing of 10 S or more and an air permeability of from 5 to 50 S, which is generally used as copier paper, is preferable.

Ink Container

An ink container according to an embodiment of the present invention includes a container and the ink according to an embodiment of the present invention contained in the container, and optionally includes other members.

The container is not limited in shape, structure, size, and material. Examples of the container include, but are not limited to, an ink bag which is formed of an aluminum laminate film or a resin film.

Examples of the ink container include an ink cartridge. The ink cartridge is described in detail below with reference to FIGS. 1 and 2.

Figure 2:
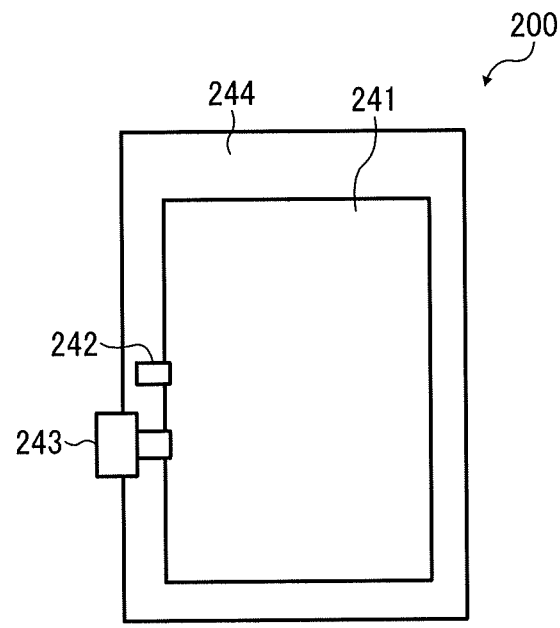
FIG. 2 is a schematic view of an ink cartridge according to an embodiment of the present invention, storing the ink bag illustrated in FIG. 1.

FIG. 1 is a schematic view of an ink bag 241. FIG. 2 is a schematic view of an ink cartridge 200 including a cartridge casing 244 storing the ink bag 241.

Referring to FIG. 1, the ink bag 241 is filled with the ink through an ink inlet 242. After the air remaining in the ink bag 241 is discharged, the ink inlet 242 is sealed by fusion.

Figure 3:
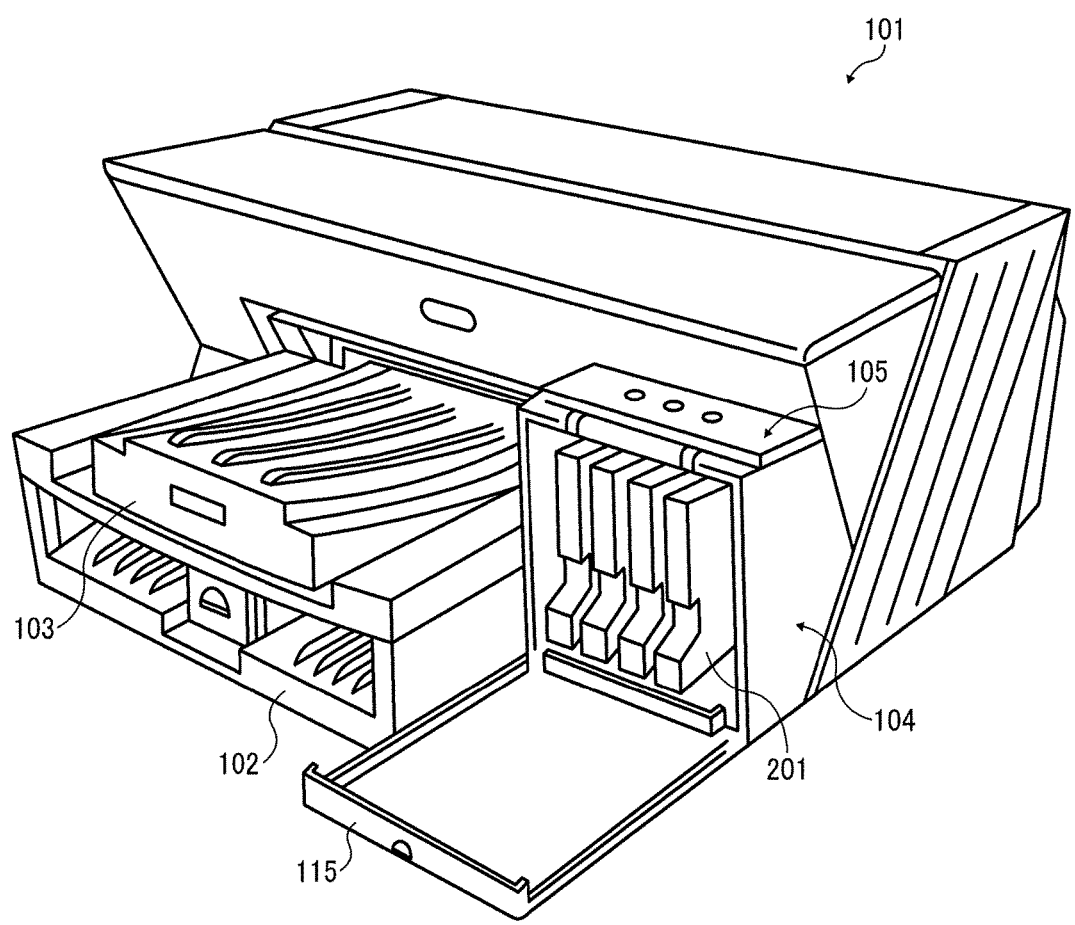
FIG. 3 is a perspective view of an inkjet recording apparatus according to an embodiment of the present invention.

When the ink bag 241 is put into use, an ink outlet 243, made of a rubber material, is pricked with a needle of an apparatus body 101 of and inkjet recording apparatus illustrated in FIG. 3 (to be described later), so that the ink can be supplied to the apparatus body 101.

The ink bag 241 may be formed of a wrapping material having no air permeability, such as an aluminum laminate film.

Referring to FIG. 2, the ink bag 241 is stored in the cartridge casing 244 made of a plastic material, thus providing the ink cartridge 200. The ink cartridge 200 can be detachably attachable to inkjet recording apparatuses.

The ink cartridge 200 containing the ink is preferably detachably attached to inkjet recording apparatuses.

Image Forming Method An image forming method according to an embodiment of the present invention includes the processes of applying a stimulus to the ink and flying the ink to a recording medium. The image forming method may further include the process of applying a treatment liquid to the recording medium before and/or after the ink impacts on the recording medium, for the purpose of improving image quality such as image density, strike-through resistance, and blurring resistance.

Ink Flying Process and Ink Flying Device

An ink flying process is a process in which a stimulus (i.e., energy) is applied to the ink to fly the ink to a recording medium.

An ink flying device is a device which applies a stimulus (i.e., energy) to the ink to fly the ink to a recording medium. Specific examples of the ink flying device include, but are not limited to, ink discharge nozzles.

An inkjet head for discharging the ink may include a liquid chamber, a fluid resistance part, a vibration plate, and a nozzle member. The inkjet head is preferably made of a material containing silicon and/or nickel, at least in part.

The nozzle of the inkjet head preferably has a diameter of 30 μm or less, more preferably from 1 to 20 μm.

The stimulus (i.e., energy) may be generated by a stimulus generator. Specific examples of the stimulus include, but are not limited to, heat (temperature), pressure, vibration, and light. Each type of these stimuli can be used alone or in combination with others. In particular, heat and pressure are preferable.

Examples of the stimulus generator include, but are not limited to, a heater, a presser, a piezoelectric element, a vibration generator, an ultrasonic oscillator, and a light source. More specifically, the stimulus generator may be a piezoelectric actuator (e.g., piezoelectric element); a thermal actuator using a thermoelectric conversion element, that uses phase change of a liquid caused by film boiling; a shape-memory alloy actuator using metal phase change caused by temperature change; and an electrostatic actuator using electrostatic force.

The ink flying process is not limited to any particular process. When the stimulus is heat, one possible method includes giving thermal energy which corresponds to a recording signal to the ink in a recording head, from a thermal head, to generate bubbles in the ink, thereby discharging or injecting the ink droplets from nozzles of the recording head by the pressure of the bubbles. When the stimulus is pressure, one possible method includes applying a voltage to a piezoelectric element attached to a pressure chamber disposed in an ink flow path in a recording head, to make the piezoelectric element bend while reducing the volume of the pressure chamber, thereby discharging or injecting the ink droplets from nozzles of the recording head.

The ink droplets preferably have a volume of from $3\times10^{-15}$ to $40\times10^{-15}$ m$^3$ (i.e., 3 to 40 pL). The discharge injection speed of the ink droplets is preferably from 5 to 20 m/s. The drive frequency of the ink droplets is preferably 1 kHz or more. The resolution of the ink droplets is preferably 300 dpi or more.

An inkjet recording method according to an embodiment of the present invention may be performed with a serial type inkjet recording apparatus illustrated in FIG. 3 as described below. The inkjet recording apparatus illustrated in FIG. 3 includes: an apparatus body 101; a sheet feeding tray 102 to load sheets to the apparatus body 101; a sheet ejection tray 103 to stack sheets having an image thereon; and an ink cartridge loading unit 104. The ink cartridge loading unit 104 includes an operation unit 105 on the upper surface thereof. The operation unit 105 includes an operation key and a display. The ink cartridge loading unit 104 further includes a front cover 115 that is openable and closable for detaching/attaching an ink cartridge 201 therefrom/thereto.

Figure 4:
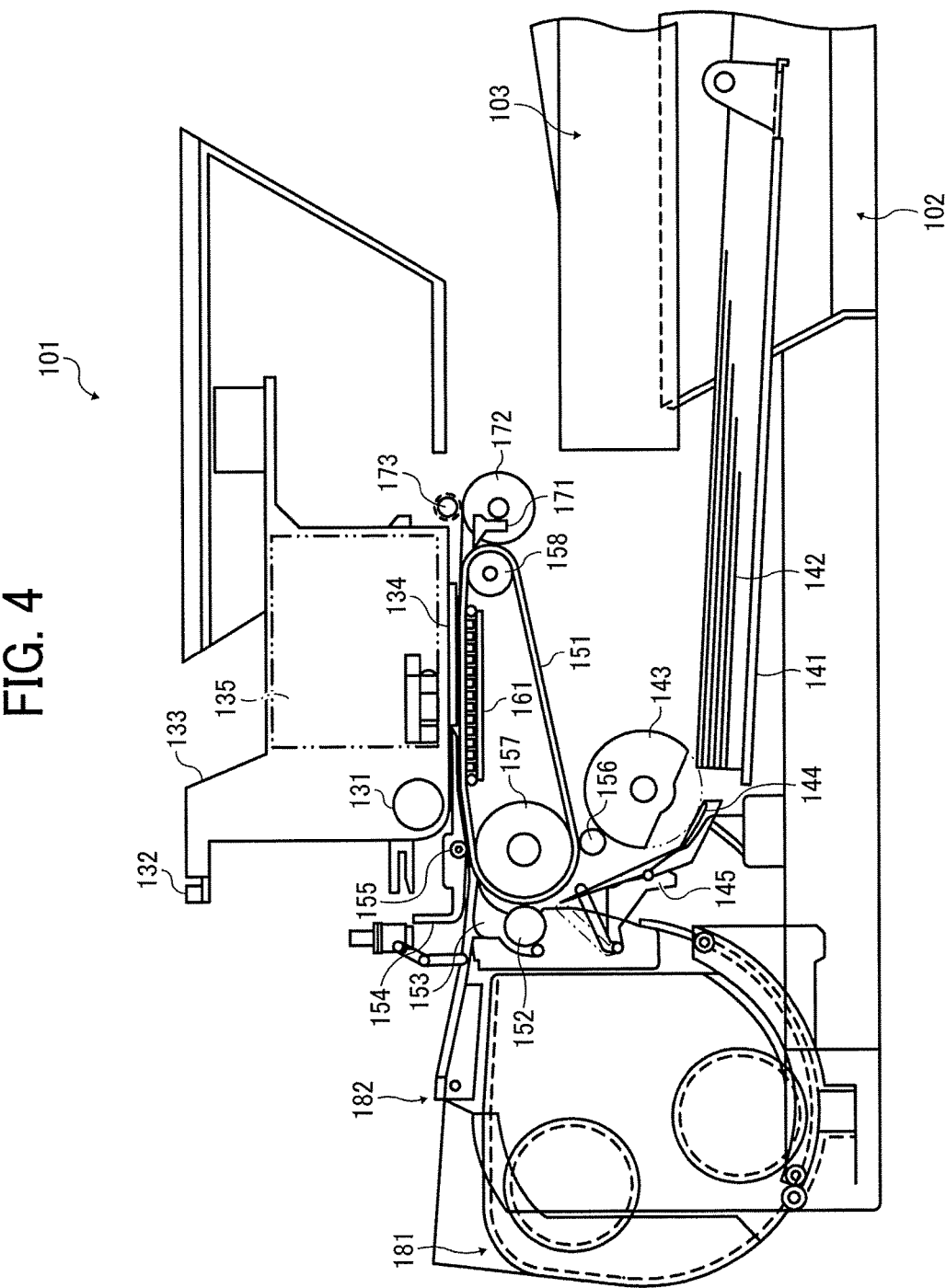
FIG. 4 is a cross-sectional view of the inkjet recording apparatus illustrated in FIG. 3.
Figure 5:
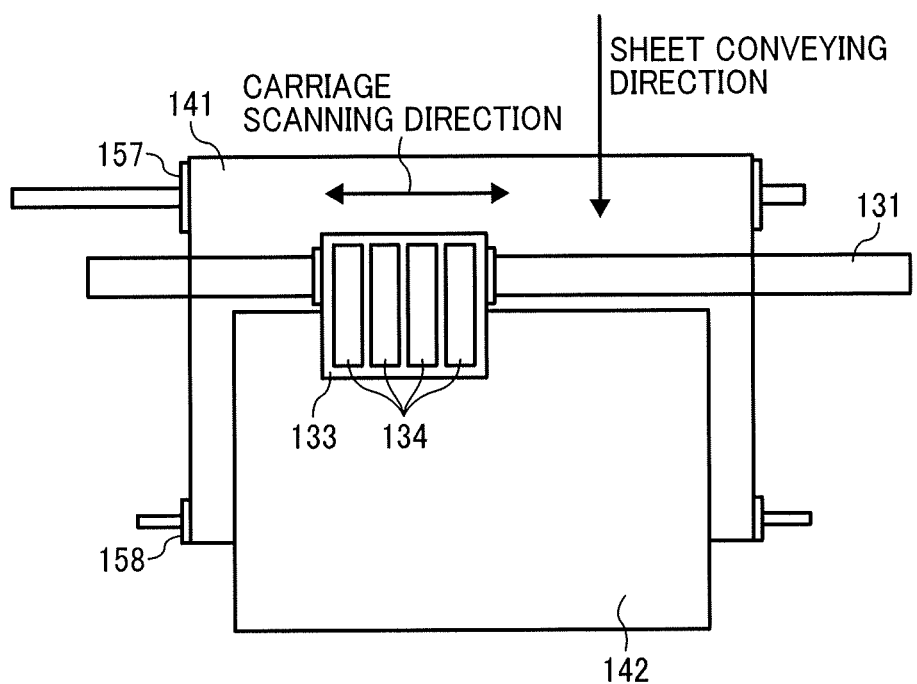
FIG. 5 is a partial cross-sectional view of the inkjet recording apparatus illustrated in FIG. 3.

Referring to FIGS. 4 and 5, the apparatus body 101 includes a guide rod 131 horizontally bridging side plates, a stay 132, and a carriage 133. The guide rod 131 and the stay 132 slidably support the carriage 133 in a main scanning direction. A main scanning motor moves the carriage 133 such that the carriage 133 scans in a carriage scanning direction shown by an arrow in FIG. 5.

The carriage 133 includes a recording head 134 that includes four inkjet heads for discharging droplets of yellow, cyan, magenta, and black inks, respectively. The inkjet heads each include multiple ink discharge nozzle arrays. The recording head 134 is mounted on the carriage 133 with the multiple ink discharge nozzle arrays intersecting with the main scanning direction and the ink droplet discharging direction coincident with a downward direction.

Each inkjet heads included in the recording head 134 may include an energy generator for discharging ink, such as: a piezoelectric actuator (e.g., piezoelectric element); a thermal actuator using a thermoelectric conversion element, that uses phase change of a liquid caused by film boiling; a shape-memory alloy actuator using metal phase change caused by temperature change; and an electrostatic actuator using electrostatic force.

The carriage 133 further includes sub tanks 135 for supplying respective color inks to the recording head 134. Each sub tank 135 is filled with the ink, having been supplied from the ink cartridge 201 loaded on the ink cartridge loading unit 104, through an ink supply tube.

The sheet feeding tray 102 includes a sheet stacker (pressure plate) 141 stacking multiple sheets 142 thereon. The apparatus body 101 includes a sheet feeder for feeding the sheets 142. The sheet feeder includes a sheet feeding roller 143 having a semicircular shape and a separation pad 144 made of a material having a large friction coefficient. The sheet feeding roller 143 separates and feeds the multiple sheets 142 one by one. The separation pad 144 is disposed facing the sheet feeding roller 143 while being biased toward the sheet feeding roller 143.

The apparatus body 101 further includes a sheet conveyer for conveying the sheets 142 fed from the sheet feeder, at below the recording head 134. The sheet conveyer includes a conveyance belt 151, a counter roller 152, a conveyance guide 153, a pressing member 154, and a leading edge pressing roller 155. The conveyance belt 151 conveys each sheet 142 while electrostatically adsorbing the sheet 142. The counter roller 152 conveys the sheet 142 fed from the sheet feeder via a guide 145, while sandwiching the sheet 142 with the conveyance belt 151. The conveyance guide 153 changes the feed direction of the sheet 142 being fed substantially vertically upward by approximately 90 degrees, to make the sheet 142 follow the conveyance belt 151. The leading edge pressing roller 155 is biased toward the conveyance belt 151 by the pressing member 154. The sheet conveyer further includes a charging roller 156 for charging a surface of the conveyance belt 151.

The conveyance belt 151 is an endless belt stretched between a conveyance roller 157 and a tension roller 158. The conveyance belt 151 is capable of circulating in a belt conveying direction. The conveyance belt 151 includes a surface layer (i.e., sheet adsorbing surface) and a back layer (i.e., middle resistance layer, ground layer). The surface layer may include a resin material having a thickness of about 40 μm without resistance control, such as ethylene-tetrafluoroethylene copolymer (ETFE). The back layer includes the same material as the surface layer further including carbon black for resistance control. On the back side of the conveyance belt 151, a guide member 161 is disposed at a position corresponding to a printing area of the recording head 134. The apparatus body 101 further includes a sheet ejector for ejecting the sheets 142 having the image recorded by the recording head 134 thereon. The sheet ejector includes a separation claw 171, a sheet ejection roller 172, and another sheet ejection roller 173. The separation claw 171 separates the multiple sheets 142 one by one. The sheet ejection tray 103 is disposed below the sheet ejection roller 172.

On the back surface side of the apparatus body 101, a duplex copy sheet feeding unit 181 is detachably mounted. The duplex copy sheet feeding unit 181 incorporates the sheet 142 which has been returned by reverse rotation of the conveyance belt 151, to reverse the sheet 142, and feeds the reversed sheet 142 again to between the counter roller 152 and the conveyance belt 151. On the upper surface of the duplex copy sheet feeding unit 181, a manual sheet feeder 182 is disposed.

The sheets 142 are separated by the sheet feeder one by one, and each of the sheets 142 is then fed substantially vertically upward while being guided by the guide 14, and sandwiched between the conveyance belt 151 and the counter roller 152. The leading edge of the sheet 142 is guided by the conveyance guide 153 and pressed against the conveyance belt 151 with the leading edge pressing roller 155. Thus, the conveyance direction of the sheet 142 is changed by approximately 90 degrees.

At this time, the conveyance belt 151 has been charged by the charging roller 156. The sheet 142 is conveyed by the conveyance belt 151 while being electrostatically adsorbed thereto. The recording head 134 is driven to discharge ink droplets according to an image signal, while the carriage 133 is being moved and the sheet 142 is being stopped, thus recoding one line of an image on the sheet 142. The sheet 142 is conveyed for a predetermined amount thereafter and the next recording operation is performed. In response to receiving a recording end signal or another signal indicating that the trailing edge of the sheet 142 has reached the recording area, the recording operation is finished and the sheet 142 is ejected on the sheet ejection tray 103.

In response to a near end detection of the ink remaining in the sub tank 135, a required amount of the ink is supplied to the sub tank 135 from the ink cartridge 201.

When the inkjet recording apparatus runs out of the ink in the ink cartridge 201, the casing of the ink cartridge 201 may be disassembled so that the ink bag 241 inside the ink cartridge 201 can be replaced. Although being placed vertically and loaded to the front face of the apparatus body 101, the ink cartridge 201 reliably supplies the inks. Thus, even in a case in which the upper surface of the apparatus body 101 is covered, for example, in a case in which the apparatus body 101 is stored in a rack or something is put on the upper surface of the apparatus body 101, the ink cartridge 201 is easily replaceable.

The inkjet recording apparatus according to some embodiments of the present invention may be either a serial (shuttle) type inkjet recording apparatus equipped with a carriage to scan, as described above, or a line type inkjet recording apparatus equipped with a line head.

The inkjet recording apparatus and inkjet recording method according to some embodiments of the present invention can be applied to various apparatuses, such as inkjet printers, facsimile machines, copiers, and multifunctional peripherals (having the functions of printer, facsimile machine, and copier).

Inkjet Recorded Matter

An ink recorded matter according to an embodiment of the present invention is recorded by the above-described inkjet recording apparatus.

The ink recorded matter includes a recording medium and an image formed with the ink on the recording medium.

Specific examples of the recording medium include, but are not limited to, plain paper, glossy paper, and general-purpose printing paper. Each type of these recording media can be used alone or in combination with others.

The ink recorded matter has high image quality without blurring and excellent temporal stability. The ink recorded matter can be used for various purposes such as a material for recording texts and/or images.

EXAMPLES

Having generally described this invention, further understanding can be obtained by reference to certain specific examples which are provided herein for the purpose of illustration only and are not intended to be limiting. In the descriptions in the following examples, the numbers represent mass ratios in parts, unless otherwise specified.

Preparation Example 1

Preparation of Magenta-Pigment-Containing Polymer Particle Dispersion Liquid
Preparation of Polymer Solution A After sufficiently replacing the air in a 1-L flask, equipped with a mechanical stirrer, a thermometer, a nitrogen gas inlet pipe, a reflux pipe, and a dropping funnel, with nitrogen gas, 11.2 g of styrene, 2.8 g of acrylic acid, 12.0 g of lauryl methacrylate, 4.0 g of polyethylene glycol methacrylate, 4.0 g of styrene macromer, and 0.4 g of mercaptoethanol were mixed in the flask and heated to 65° C.

Next, a mixture liquid containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobis methylvaleronitrile, and 18 g of methyl ethyl ketone was dropped in the flask over a period of 2.5 hours. Next, another mixture liquid containing 0.8 g of azobis methylvaleronitrile and 18 g of methyl ethyl ketone was further dropped in the flask over a period of 0.5 hours. After aging the mixture at 65° C. for 1 hour, 0.8 g of azobis methylvaleronitrile was added thereto, and the mixture was further aged for 1 hour. After completion of the reaction, 364 g of methyl ethyl ketone was added to the flask. Thus, 800 g a polymer solution A having a concentration of 50% was obtained.
Preparation of Pigment-Containing Polymer Particle Dispersion Liquid First, 28 g of the polymer solution A, 42 g of C.I. Pigment Red 122, 13.6 g of a 1-mol/L aqueous solution of potassium hydroxide, 20 g of methyl ethyl ketone, and 13.6 g of ion-exchange water were sufficiently mixed and stirred. The resulting mixture was kneaded with a roll mill. The resulting paste was poured in 200 g of pure water and sufficiently stirred, and methyl ethyl ketone and water were evaporated therefrom using an evaporator. The resulting dispersion liquid was subjected to pressure filtration using a polyvinylidene fluoride membrane filter having an average pore diameter of 5.0 µm to remove coarse particles. Thus, a magenta-pigment-containing polymer particle dispersion liquid containing 15% by mass of the pigment and 20% by mass of solid contents was prepared. The average particle diameter (D50) of the polymer particle contained in the magenta-pigment-containing polymer particle dispersion liquid was 82.7 nm. The average particle diameter (D50) was measured with a particle size distribution analyzer (NANOTRAC UPA-EX150 available from Nikkiso Co., Ltd.).

Preparation Example 2

Preparation of Cyan-Pigment-Containing Polymer Particle Dispersion Liquid

The procedure in Preparation Example 1 was repeated except for replacing the magenta pigment C.I. Pigment Red 122 with a phthalocyanine pigment (C.I. Pigment Blue 15:3). Thus, a cyan-pigment-containing polymer particle dispersion liquid was prepared.

The particle diameter (D50) of the polymer particle contained in the cyan-pigment-containing polymer particle dispersion liquid measured by a particle size distribution analyzer (NANOTRAC UPA-EX150 available from Nikkiso Co., Ltd.) was 110.6 nm.

Preparation Example 3

Preparation of Yellow-Pigment-Containing Polymer Particle Dispersion Liquid

The procedure in Preparation Example 1 was repeated except for replacing the magenta pigment C.I. Pigment Red 122 with a monoazo yellow pigment (C.I. Pigment Yellow 74). Thus, a yellow-pigment-containing polymer particle dispersion liquid was prepared.

The particle diameter (D50) of the polymer particle contained in the yellow-pigment-containing polymer particle dispersion liquid measured by a particle size distribution analyzer (NANOTRAC UPA-EX150 available from Nikkiso Co., Ltd.) was 105.4 nm.

Preparation Example 4

Preparation of Carbon-Black-Pigment-Containing Polymer Particle Dispersion Liquid The procedure in Preparation Example 1 was repeated except for replacing the magenta pigment C.I. Pigment Red 122 with a carbon black (FW100 available from Degussa). Thus, a carbon-black-pigment-containing polymer particle dispersion liquid was prepared.

The particle diameter (D50) of the polymer particle contained in the carbon-black-pigment-containing polymer particle dispersion liquid measured by a particle size distribution analyzer (NANOTRAC UPA-EX150 available from Nikkiso Co., Ltd.) was 75.2 nm.

Preparation Example 5

First, 200 parts of a carbon black (NIPEX 150 available from Deggusa, having a BET specific surface area of 110 $m^2/g$, an average primary particle diameter of 29 nm, a pH of 4.0, and a DBP oil absorption of 400 g/100 g), 12.5 parts of a sodium naphthalenesulfonate formalin condensate (PAIONIN A-45-PN available from Takemoto Oil & Fat Co., Ltd., the total content of dimer, trimer, and tetramer of naphthalenesulfonic acid being 30% by mass), and 788 parts of distilled water were premixed. Thus, a mixture slurry was prepared. The mixture slurry was subjected to a circulation dispersion using a disc-type media mill (MSC mill available from Nippon Coke & Engineering Co., Ltd.) filled with zirconia beads having a diameter of 0.015 mm with a filing ratio of 70% at a peripheral speed of 8 m/s and a liquid temperature of 10° C. for 3 minutes. The mixture slurry was then subjected to a centrifugal separation using a centrifugal separator (MODEL-7700 available from KUBOTA Corporation) to remove coarse particles. Thus, a black pigment dispersion 1 was prepared. The particle diameter (D50) of the black pigment dispersion 1 measured by a particle size distribution analyzer (MICROTRAC UPA available from Nikkiso Co., Ltd.) was 125 nm.

Preparation Example 6

Preparation of Acrylic Silicone Resin Particle Aqueous Dispersion 1 After sufficiently replacing the air in a 1-L flask, equipped with a mechanical stirrer, a thermometer, a nitrogen gas inlet pipe, a reflux pipe, and a dropping funnel, with nitrogen gas, 17.5 g of LATEMUL S-180 (available from Kao Corporation) and 350 g of ion-exchange water were mixed in the flask and heated to 65° C.

After the heating, 3.0 g of t-butyl peroxybenzoate (serving as a reaction initiator) and 1.0 g of sodium isoascorbate were added to the flask. Five minutes later, a mixture of 45 g of methyl methacrylate, 160 g of 2-etyhylhexyl methacrylate, 5 g of acrylic acid, 45 g of butyl methacrylate, 30 g of cyclohexyl methacrylate, 15 g of vinyl triethoxysilane, 8.0 g of LATEMUL S-180 (available from Kao Corporation), and 340 g of ion-exchange water was dropped in the flask over a period of 3 hours.

The flask contents were aged at 80° C. for 2 hours and then cooled to normal temperature. The pH thereof was adjusted to 7 to 8 using sodium hydroxide.

Ethanol was removed using an evaporator, and the moisture content was controlled. Thus, 730 g of an acrylic silicone resin particle aqueous dispersion 1 containing 40% by mass of solid contents was prepared. The particle diameter (D50) of the acrylic silicone resin particle aqueous dispersion 1 measured by a particle size distribution analyzer (NANOTRAC UPA-EX150 available from Nikkiso Co., Ltd.) was 35 nm.

Preparation Example 7

Preparation of Polyurethane Resin Particle Aqueous Dispersion 1

A simple pressure reactor equipped with a stirrer and a heater was charged with 287.9 g of a crystalline polycarbonate diol (DURANOL™ T6002 available from Asahi Kasei Chemicals Corp.) having a number average molecular weight (Mn) of 2,000, 3.6 g of 1,4-butanediol, 8.9 g of DMPA (dimethylol propionic acid), 98.3 g of hydrogenated MDI, and 326.2 parts of acetone while introducing nitrogen thereto.

The contents were heated to 90° C. and subjected to an urethane-forming reaction over a period of 8 hours to produce a prepolymer. The reaction product mixture was cooled to 40° C. and mixed with 10.0 g of triethylamine. The mixture was further mixed with 568.8 g of water, and emulsification was caused by a rotor-stator-type mechanical emulsifier. Thus, an aqueous dispersion was prepared. Next, 28.1 g of a 10% aqueous solution of ethylenediamine was added to the above-obtained aqueous dispersion being stirred. The aqueous dispersion was further stirred for 5 hours at 50° C. to cause a chain elongation reaction.

Acetone was removed from the aqueous dispersion under reduced pressure at 65° C., and the moisture content was controlled. Thus, a polyurethane resin particle aqueous dispersion 1 containing 40% by mass of solid contents was prepared. The particle diameter (D50) of the polyurethane resin particle aqueous dispersion 1 measured by a particle size distribution analyzer (NANOTRAC UPA-EX150 available from Nikkiso Co., Ltd.) was 9 nm.

Preparation Example 8

Preparation of Polyurethane Resin Particle Aqueous Dispersion 2 The procedure in Preparation Example 7 was repeated except for changing the addition amount of triethylamine to 6.8 g. Thus, a polyurethane resin particle aqueous dispersion 2 was prepared. The particle diameter (D50) of the polyurethane resin particle aqueous dispersion 2 measured by a particle size distribution analyzer (NANOTRAC UPA-EX150 available from Nikkiso Co., Ltd.) was 25 nm.

Preparation Example 9

Preparation of Polyurethane Resin Particle Aqueous Dispersion 3 The procedure in Preparation Example 7 was repeated except for changing the addition amount of triethylamine to 3.9 g. Thus, a polyurethane resin particle aqueous dispersion 3 was prepared. The particle diameter (D50) of the polyurethane resin particle aqueous dispersion 3 measured by a particle size distribution analyzer (NANOTRAC UPA-EX150 available from Nikkiso Co., Ltd.) was 95 nm.

Examples 1-19 and Comparative Examples 1-13

Preparation of Inkjet Inks Each inkjet ink was prepared as follows.

According to the formulations described in Tables 1-1 and 1-2, first, organic solvents, surfactants, and water were uniformly stirred and mixed for one hour. Next, each resin particle dispersion liquid was added to each mixture and stirred for one hour, and then each pigment dispersion liquids was added to each mixture and stirred for one hour. Each of the resulting dispersion liquids was subjected to a pressure filtration using a polyvinylidene fluoride membrane filter having an average pore diameter of 5.0 µm to remove coarse particles and foreign substances. Thus, inks of Examples 1-19 and Comparative Examples 1-13 were prepared. In addition to the contents listed in Tables 1-1 and 1-2, a penetrant, an antifungal agent, a defoamer, and a pH adjuster were added to each ink.

TABLE 1-1

| | | D50 (nm) | Examples |||||||
|---|---|---|---|---|---|---|---|---|---|
| | | | 1 | 2 | 3 | 4 | 5 | 6 | 7 |
| Pigment Dispersion Liquids (as Pigment Solid Contents) | Magenta-pigment-containing Polymer Particle Dispersion Liquid (Preparation Example 1) | | | | | | | | |
| | Cyan-pigment-containing Polymer Particle Dispersion Liquid (Preparation Example 2) | | | | | | | | |
| | Yellow-pigment-containing Polymer Particle Dispersion Liquid (Preparation Example 3) | | | | | | | | |
| | Black-pigment-containing Polymer Particle Dispersion Liquid (Preparation Example 4) | | | | | | | | |
| | Black Pigment Dispersion (Preparation Example 5) | | | | | | | | |
| | Self-dispersible Magenta Pigment Dispersion Liquid (CAB-O-JET 260) | | | | | | | | |
| | Self-dispersible Cyan Pigment Dispersion Liquid (CAB-O-JET 250) | | | | | | | | |
| | Self-dispersible Yellow Pigment Dispersion Liquid (CAB-O-JET 270) | | | | | | | | |
| | Self-dispersible Black Pigment Dispersion Liquid (CAB-O-JET 300) | | 8 | 8 | 8 | 8 | 8 | 8 | 8 |

TABLE 1-1-continued

| | | | | | | | | | |
|---|---|---|---|---|---|---|---|---|---|
| Resin Particle Dispersion Liquids (as Solid Contents) | Acrylic Silicone Resin Particle Aqueous Dispersion (Preparation Example 6) | 35 | | | | | | | |
| | Polyurethane Resin Particle Aqueous Dispersion 1 (Preparation Example 7) | 9 | | | | | | | |
| | Polyurethane Resin Particle Aqueous Dispersion 2 (Preparation Example 8) | 25 | | | 2 | | | | |
| | Polyurethane Resin Particle Aqueous Dispersion 3 (Preparation Example 9) | 95 | | | | | | | |
| | Urethane Resin UA-3945 | 35 | 2 | | | | | | |
| | Urethane Resin UWS-145 | 17 | | 2 | | 2 | 2 | 2 | 2 |
| | Urethane Resin APX-101 | 160 | | | | | | | |
| Organic Solvents | 3-Methoxy-1-butanol | | 2 | | 2 | 1 | 8 | | 10 |
| | 3-Methoxy-1-propanol | | | 2 | | | | 8 | |
| | Glycerin | | 14 | 13 | 14 | 15 | 7 | 8 | 5 |
| | 1,2-Butanediol | | | | | | | | |
| | 1,3-Butanediol | | 10 | 10 | 10 | 10 | 10 | 10 | 10 |
| | 3-Methyl-1,3-butanediol | | 10 | 10 | 10 | 10 | 10 | 10 | 10 |
| Surfactants | DSN403N | | 0.10 | | 0.10 | 0.10 | 0.10 | 0.10 | 0.10 |
| | EP7025 | | | 0.50 | | | | | |
| | Pure Water | | Residue | Residue | Residue | Residue | Residue | Residue | Residue |
| | Total | | 100 | 100 | 100 | 100 | 100 | 100 | 100 |
| | Solvent Quantity | | 36.1 | 35.5 | 36.1 | 36.1 | 35.1 | 36.1 | 35.1 |
| | Solvents/Resin Ratio | | 1.0 | 1.0 | 1.0 | 0.5 | 4.0 | 4.0 | 5.0 |
| | Viscosity (mPa·s) | | 7.8 | 8.0 | 8.2 | 8.3 | 7.8 | 7.8 | 8.0 |
| | Change in Viscosity (%) (Storage Stability) | | 0.5 | −0.5 | 0.7 | −1.0 | 1.8 | 2.0 | 4.0 |
| | Rub Resistance 1: Image Peel-off | | A | A | A | A | A | A | A |
| | Rub Resistance 2: Fouling in Non-printed Part | | A | A | A | A | A | A | A |
| | Discharge Stability | | A | A | A | A | A | A | B |

| | | D50 (nm) | Examples | | | | | | |
|---|---|---|---|---|---|---|---|---|---|
| | | | 8 | 9 | 10 | 11 | 12 | 13 | 14 |
| Pigment Dispersion Liquids (as Pigment Solid Contents) | Magenta-pigment-containing Polymer Particle Dispersion Liquid (Preparation Example 1) | | | | | | | | |
| | Cyan-pigment-containing Polymer Particle Dispersion Liquid (Preparation Example 2) | | | | | | | | |
| | Yellow-pigment-containing Polymer Particle Dispersion Liquid (Preparation Example 3) | | | | | | | | |
| | Black-pigment-containing Polymer Particle Dispersion Liquid (Preparation Example 4) | | | | | | | | |
| | Black Pigment Dispersion (Preparation Example 5) | | | | | | | | 8 |
| | Self-dispersible Magenta Pigment Dispersion Liquid (CAB-O-JET 260) | | | | | | | 7 | |
| | Self-dispersible Cyan Pigment Dispersion Liquid (CAB-O-JET 250) | | | | | | 5 | | |
| | Self-dispersible Yellow Pigment Dispersion Liquid (CAB-O-JET 270) | | | | | 5 | | | |
| | Self-dispersible Black Pigment Dispersion Liquid (CAB-O-JET 300) | | 8 | 8 | 8 | | | | |
| Resin Particle Dispersion Liquids (as Solid Contents) | Acrylic Silicone Resin Particle Aqueous Dispersion (Preparation Example 6) | 35 | | | | | | | |
| | Polyurethane Resin Particle Aqueous Dispersion 1 (Preparation Example 7) | 9 | | | | | | | |
| | Polyurethane Resin Particle Aqueous Dispersion 2 (Preparation Example 8) | 25 | | | | 2 | | 1 | |
| | Polyurethane Resin Particle Aqueous Dispersion 3 (Preparation Example 9) | 95 | | | | | | | |
| | Urethane Resin UA-3945 | 35 | | | | | | | |
| | Urethane Resin UWS-145 | 17 | 2 | 1 | 3 | | 3 | | 2 |
| | Urethane Resin APX-101 | 160 | | | | | | | |
| Organic Solvents | 3-Methoxy-1-butanol | | 12 | 2 | 1 | 2 | | 2 | |
| | 3-Methoxy-1-propanol | | | | | | 2 | | 2 |
| | Glycerin | | 4 | 13 | 12 | 14 | 13 | 13 | 14 |
| | 1,2-Butanediol | | | | | | | | |
| | 1,3-Butanediol | | 10 | 10 | 10 | 15 | 11 | 10 | 10 |
| | 3-Methyl-1,3-butanediol | | 10 | 10 | 10 | 10 | 10 | 10 | 10 |
| Surfactants | DSN403N | | 0.10 | 0.10 | 0.10 | | 0.10 | 0.10 | 0.10 |
| | EP7025 | | | | | 0.50 | | | |
| | Pure Water | | Residue | Residue | Residue | Residue | Residue | Residue | Residue |
| | Total | | 100 | 100 | 100 | 100 | 100 | 100 | 100 |
| | Solvent Quantity | | 36.1 | 35.1 | 33.1 | 41.5 | 36.1 | 35.1 | 36.1 |
| | Solvents/Resin Ratio | | 6.0 | 2.0 | 0.3 | 1.0 | 0.7 | 2.0 | 1.0 |
| | Viscosity (mPa·s) | | 8.0 | 8.3 | 7.8 | 8.0 | 7.8 | 8.3 | 8.0 |
| | Change in Viscosity (%) (Storage Stability) | | 5.5 | 0.1 | −1.1 | 0.5 | 0.2 | −0.5 | −1.0 |
| | Rub Resistance 1: Image Peel-off | | A | A | A | A | A | A | A |
| | Rub Resistance 2: Fouling in Non-printed Part | | A | A | A | A | A | A | A |

TABLE 1-1-continued

| | | | | | | | | |
|---|---|---|---|---|---|---|---|---|
| Discharge Stability | | B | A | A | A | A | A | A |

| | | D50 | Examples | | | | |
|---|---|---|---|---|---|---|---|
| | | (nm) | 15 | 16 | 17 | 18 | 19 |
| Pigment Dispersion Liquids (as Pigment Solid Contents) | Magenta-pigment-containing Polymer Particle Dispersion Liquid (Preparation Example 1) | | | | | 7 | |
| | Cyan-pigment-containing Polymer Particle Dispersion Liquid (Preparation Example 2) | | | | 5 | | |
| | Yellow-pigment-containing Polymer Particle Dispersion Liquid (Preparation Example 3) | | | 5 | | | |
| | Black-pigment-containing Polymer Particle Dispersion Liquid (Preparation Example 4) | | 8 | | | | |
| | Black Pigment Dispersion (Preparation Example 5) | | | | | | |
| | Self-dispersible Magenta Pigment Dispersion Liquid (CAB-O-JET 260) | | | | | | |
| | Self-dispersible Cyan Pigment Dispersion Liquid (CAB-O-JET 250) | | | | | | |
| | Self-dispersible Yellow Pigment Dispersion Liquid (CAB-O-JET 270) | | | | | | |
| | Self-dispersible Black Pigment Dispersion Liquid (CAB-O-JET 300) | | | | | | 8 |
| Resin Particle Dispersion Liquids (as Solid Contents) | Acrylic Silicone Resin Particle Aqueous Dispersion (Preparation Example 6) | 35 | | | | | |
| | Polyurethane Resin Particle Aqueous Dispersion 1 (Preparation Example 7) | 9 | | | | | |
| | Polyurethane Resin Particle Aqueous Dispersion 2 (Preparation Example 8) | 25 | 2 | | 3 | | |
| | Polyurethane Resin Particle Aqueous Dispersion 3 (Preparation Example 9) | 95 | | | | | |
| | Urethane Resin UA-3945 | 35 | | | | | 2 |
| | Urethane Resin UWS-145 | 17 | | 3 | | 2 | |
| | Urethane Resin APX-101 | 160 | | | | | |
| Organic Solvents | 3-Methoxy-1-butanol | | 2 | | 2 | 2 | 1 |
| | 3-Methoxy-1-propanol | | | 2 | | 2 | 1 |
| | Glycerin | | 8 | 13 | 14 | 8 | 14 |
| | 1,2-Butanediol | | | | | | |
| | 1,3-Butanediol | | 10 | 10 | 10 | 10 | 10 |
| | 3-Methyl-1,3-butanediol | | 10 | 10 | 10 | 10 | 10 |
| Surfactants | DSN403N | | 0.10 | 0.10 | 0.10 | 0.10 | 0.10 |
| | EP7025 | | | | | | |
| | Pure Water | | Residue | Residue | Residue | Residue | Residue |
| | Total | | 100 | 100 | 100 | 100 | 100 |
| | Solvent Quantity | | 30.1 | 35.1 | 36.1 | 30.1 | 36.1 |
| | Solvents/Resin Ratio | | 1.0 | 0.7 | 0.7 | 1.0 | 1.0 |
| | Viscosity (mPa·s) | | 8.0 | 8.0 | 8.0 | 8.0 | 7.9 |
| | Change in Viscosity (%) (Storage Stability) | | 0.5 | −1.1 | 1.0 | 2.5 | 0.3 |
| | Rub Resistance 1: Image Peel-off | | A | A | A | A | A |
| | Rub Resistance 2: Fouling in Non-printed Part | | A | A | A | A | A |
| | Discharge Stability | | A | A | A | A | A |

TABLE 1-2

| | | D50 | Comparative Examples | | | | | | |
|---|---|---|---|---|---|---|---|---|---|
| | | (nm) | 1 | 2 | 3 | 4 | 5 | 6 | 7 |
| Pigment Dispersion Liquids (as Pigment Solid Contents) | Magenta-pigment-containing Polymer Particle Dispersion Liquid (Preparation Example 1) | | | | | | | | |
| | Cyan-pigment-containing Polymer Particle Dispersion Liquid (Preparation Example 2) | | | | | | | | |
| | Yellow-pigment-containing Polymer Particle Dispersion Liquid (Preparation Example 3) | | | | | | | | |
| | Black-pigment-containing Polymer Particle Dispersion Liquid (Preparation Example 4) | | | | | | | | |
| | Black Pigment Dispersion (Preparation Example 5) | | | | | | | | 8 |
| | Self-dispersible Magenta Pigment Dispersion Liquid (CAB-O-JET 260) | | | | | | | 7 | |
| | Self-dispersible Cyan Pigment Dispersion Liquid (CAB-O-JET 250) | | | | | | 5 | | |
| | Self-dispersible Yellow Pigment Dispersion Liquid (CAB-O-JET 270) | | | | | | | | |
| | Self-dispersible Black Pigment | | 8 | 8 | 8 | 8 | | | |

TABLE 1-2-continued

| | | D50 | | | | | | | |
|---|---|---|---|---|---|---|---|---|---|
| Pigment Dispersion Liquids (as Pigment Solid Contents) | Magenta-pigment-containing Polymer Particle Dispersion Liquid (Preparation Example 1) | | | | | | | | |
| | Cyan-pigment-containing Polymer Particle Dispersion Liquid (Preparation Example 2) | | | | | | | | |
| | Yellow-pigment-containing Polymer Particle Dispersion Liquid (Preparation Example 3) | | | | | | | | |
| | Black-pigment-containing Polymer Particle Dispersion Liquid (Preparation Example 4) | | | | | | | | |
| | Black Pigment Dispersion (Preparation Example 5) | | | | | | | | |
| | Self-dispersible Magenta Pigment Dispersion Liquid (CAB-O-JET 260) | | | | | | | | |
| | Self-dispersible Cyan Pigment Dispersion Liquid (CAB-O-JET 250) | | | | | | | | |
| | Self-dispersible Yellow Pigment Dispersion Liquid (CAB-O-JET 270) | | | | | | | | |
| | Self-dispersible Black Pigment Dispersion Liquid (CAB-O-JET 300) | 35 | 2 | | | | | | |
| Resin Particle Dispersion Liquids (as Solid Contents) | Acrylic Silicone Resin Particle Aqueous Dispersion (Preparation Example 6) | | | | | | | | |
| | Polyurethane Resin Particle Aqueous Dispersion 1 (Preparation Example 7) | 9 | | | | | | | |
| | Polyurethane Resin Particle Aqueous Dispersion 2 (Preparation Example 8) | 25 | | | 2 | 4 | | 1 | |
| | Polyurethane Resin Particle Aqueous Dispersion 3 (Preparation Example 9) | 95 | | | | | | | |
| | Urethane Resin UA-3945 | 35 | | 2 | | | | | |
| | Urethane Resin UWS-145 | 17 | | | 2 | | | 2 | 1 |
| | Urethane Resin APX-101 | 160 | | | | | | | |
| Organic Solvents | 3-Methoxy-1-butanol | | | | | | | | |
| | 3-Methoxy-1-propanol | | | | | | | | |
| | Glycerin | | 15 | 15 | 15 | 15 | 15 | 15 | 16 |
| | 1,2-Butanediol | | 11 | | | | | | |
| | 1,3-Butanediol | | 10 | 15 | 15 | 15 | 15 | 15 | 10 |
| | 3-Methyl-1,3-butanediol | | | 5 | 5 | 5 | 8 | 7 | 10 |
| Surfactants | DSN403N | | 0.10 | | 0.10 | 0.10 | 0.10 | 0.10 | 0.10 |
| | EP7025 | | | 0.50 | | | | | |
| | Pure Water | | Residue | Residue | Residue | Residue | Residue | Residue | Residue |
| | Total | | 100 | 100 | 100 | 100 | 100 | 100 | 100 |
| | Solvent Quantity | | 36.1 | 35.5 | 35.1 | 35.1 | 38.1 | 37.1 | 36.1 |
| | Solvents/Resin Ratio | | — | 0.0 | 0.0 | 0.0 | 0.0 | 0.0 | 0.0 |
| | Viscosity (mPa · s) | | 8.0 | 8.1 | 8.1 | 7.2 | 8.0 | 8.0 | 8.0 |
| | Change in Viscosity (%) (Storage Stability) | | 1.0 | 2.0 | −18.0 | −8.0 | −12.0 | −16.2 | −12.1 |
| | Rub Resistance 1: Image Peel-off | | C | B | A | A | A | A | A |
| | Rub Resistance 2: Fouling in Non-printed Part | | C | A | A | A | A | A | A |
| | Discharge Stability | | A | A | A | A | A | A | A |

| | | D50 (nm) | Comparative Examples | | | | | |
|---|---|---|---|---|---|---|---|---|
| | | | 8 | 9 | 10 | 11 | 12 | 13 |
| Pigment Dispersion Liquids (as Pigment Solid Contents) | Magenta-pigment-containing Polymer Particle Dispersion Liquid (Preparation Example 1) | | | | | | | |
| | Cyan-pigment-containing Polymer Particle Dispersion Liquid (Preparation Example 2) | | | | 5 | | | |
| | Yellow-pigment-containing Polymer Particle Dispersion Liquid (Preparation Example 3) | | | 5 | | | | |
| | Black-pigment-containing Polymer Particle Dispersion Liquid (Preparation Example 4) | | 8 | | | | | |
| | Black Pigment Dispersion (Preparation Example 5) | | | | | | | |
| | Self-dispersible Magenta Pigment Dispersion Liquid (CAB-O-JET 260) | | | | | | | |
| | Self-dispersible Cyan Pigment Dispersion Liquid (CAB-O-JET 250) | | | | | | | |
| | Self-dispersible Yellow Pigment Dispersion Liquid (CAB-O-JET 270) | | | | | | | |
| | Self-dispersible Black Pigment Dispersion Liquid (CAB-O-JET 300) | | | | | 8 | 8 | 8 |
| Resin Particle Dispersion Liquids (as Solid Contents) | Acrylic Silicone Resin Particle Aqueous Dispersion (Preparation Example 6) | 35 | | | | | | |
| | Polyurethane Resin Particle Aqueous Dispersion 1 (Preparation Example 7) | 9 | | | | | 2 | |
| | Polyurethane Resin Particle Aqueous Dispersion 2 (Preparation Example 8) | 25 | 2 | | 3 | | | |
| | Polyurethane Resin Particle Aqueous Dispersion 3 (Preparation Example 9) | 95 | | | | 2 | | |
| | Urethane Resin UA-3945 | 35 | | | | | | |
| | Urethane Resin UWS-145 | 17 | | 3 | | | | |
| | Urethane Resin APX-101 | 160 | | | | | | 2 |
| Organic Solvents | 3-Methoxy-1-butanol | | | | | | | |
| | 3-Methoxy-1-propanol | | | | | | | |
| | Glycerin | | 10 | 16 | 16 | 10 | 15 | 15 |
| | 1,2-Butanediol | | | | | | | |
| | 1,3-Butanediol | | 10 | 10 | 10 | 10 | 10 | 10 |
| | 3-Methyl-1,3-butanediol | | 10 | 9 | 9.5 | 10 | 10 | 10 |
| Surfactants | DSN403N | | 0.10 | 0.10 | 0.10 | 0.10 | 0.10 | 0.10 |
| | EP7025 | | | | | | | |
| | Pure Water | | Residue | Residue | Residue | Residue | Residue | Residue |
| | Total | | 100 | 100 | 100 | 100 | 100 | 100 |

TABLE 1-2-continued

|  |  |  |  |  |  |  |
|---|---|---|---|---|---|---|
| Solvent Quantity | 30.1 | 35.1 | 35.6 | 30.1 | 35.1 | 35.1 |
| Solvents/Resin Ratio | 0.0 | 0.0 | 0.0 | 0.0 | 0.0 | 0.0 |
| Viscosity (mPa · s) | 8.0 | 8.0 | 8.0 | 8.0 | 10.5 | 8.1 |
| Change in Viscosity (%) (Storage Stability) | −9.2 | −20.5 | −18.2 | 2.8 | 0.5 | 2.2 |
| Rub Resistance 1: Image Peel-off | A | A | A | C | C | C |
| Rub Resistance 2: Fouling in Non-printed Part | A | A | A | C | C | C |
| Discharge Stability | A | A | A | A | A | A |

Abbreviations listed in Tables 1-1 and 1-2 represent the following compounds.

Pigment Dispersion Liquids

CAB-O-JET 260: A self-dispersible magenta pigment dispersion liquid containing 11% of pigment solid contents, available from Cabot Corporation.

CAB-O-JET 250: A self-dispersible cyan pigment dispersion liquid containing 11% of pigment solid contents, available from Cabot Corporation.

CAB-O-JET 270: A self-dispersible yellow pigment dispersion liquid containing 11% of pigment solid contents, available from Cabot Corporation.

CAB-O-JET 300: A self-dispersible black pigment dispersion liquid containing 15% of pigment solid contents, available from Cabot Corporation.

Resin Particle Dispersion Liquids

Urethane Resin UA-3945: An urethane resin particle dispersion liquid UCOAT UA-3945 available from Sanyo Chemical industries, Ltd., containing 38.4% by mass of solid contents and having an average particle diameter of 35 nm.

Urethane Resin UWS-145: An urethane resin particle dispersion liquid UCOAT UWS-145 available from Sanyo Chemical industries, Ltd., containing 35.0% by mass of solid contents and having an average particle diameter of 17 nm.

Urethane Resin APX-101: An urethane resin particle dispersion liquid HYDRAN APX-101H available from DIC Corporation, containing 45% by mass of solid contents and having an average particle diameter of 160 nm and a minimum film forming temperature (MFT) of 20° C.

Surfactants

DSN403N: A fluorosurfactant DSN403N available from Daikin Industries, Ltd., containing 98% by mass or more of active ingredients. EP-7025: A polyoxyalkylene alkyl ether SOFTANOL EP-7025 available from NIPPON SHOKUBAI CO., LTD., containing 100% by mass of active ingredients.

Evaluation Items

Ink Properties

Viscosity of Ink

Viscosity of each ink was measured with a viscometer (RE-550L available from Toki Sangyo Co., Ltd.) at 25° C.

pH of Ink pH of each ink was measured with a pH meter (HM-30R available from DKK-TOA Corporation) at 25° C.

Particle Diameter (D50)

Each ink was diluted with pure water such that the solid content concentration became 0.01% by mass. A particle diameter (D50) of the pigment in each ink was measured with a particle size distribution analyzer (NANOTRAC UPA-EX150 available from Nikkiso Co., Ltd.).

Storage Stability of Ink

Each ink was sealed in a polyethylene container and stored at 70° C. for 1 week. Before and after the storage, each ink was subjected to the measurement of viscosity. The rate of change in viscosity before and after the storage was determined by the following formula 1, and storage stability of the ink was evaluated according to the following evaluation criteria.

$$\text{Change in Viscosity (\%)} = \frac{((\text{Ink Viscosity After Storage}) - (\text{Ink Viscosity Before Storage}))}{(\text{Ink Viscosity Before Storage})} \times 100 \quad \text{(Formula 1)}$$

Evaluation Criteria

A: The rate of change in viscosity was less than 4%.

B: The rate of change in viscosity was 4% or more and less than 8%.

C: The rate of change in viscosity was 8% or more.

Image Formation

Each ink was mounted on an inkjet recording apparatus (IPSiO GXe-5500 available from Ricoh Co., Ltd.). The drive voltage of the piezo element in this inkjet recording apparatus was changed such that the discharge amount of ink become constant and the deposited amount of the ink on a recording medium become constant, under an environmental condition of 23±0.5° C., 50±5% RH. The inkjet recording apparatus was allowed to print image while setting the printing mode to "Plain paper/Fast" or "Glossy paper/Slow".

Rub Resistance 1: Image Peel-Off

A solid image chart with each side having a length of 3 cm was printed on a sheet of a glossy paper POSTER PAPER MAX available from Sakurai Co., Ltd. having a basis weight of 180 g/m² while setting the printing mode to "Glossy paper/Fast".

After being dried, the printed part was rubbed with cotton cloth back and forth 5 times. The printed part was then visually observed to check whether image peel-off had occurred or not. Rub resistance 1 was evaluated based on the following criteria.

Evaluation Criteria

A: No image peel-off was observed.

B: Slight image peel-off was observed at the end parts of the image.

C: Image peel-off was observed.

Rub Resistance 2: Fouling in Non-Printed Part

A solid image chart with each side having a length of 3 cm was printed on a sheet of a glossy paper POSTER PAPER MAX available from Sakurai Co., Ltd. having a basis weight of 180 g/m² while setting the printing mode to "Glossy paper/Fast".

After being dried, the printed part was rubbed with cotton cloth back and forth 5 times. The non-printed part was then visually observed to check whether image stretching or fouling (caused by image transfer) had occurred or not. Rub resistance 2 was evaluated based on the following criteria.

Evaluation Criteria

A: No fouling was observed.

B: Slight fouling was observed.

C: Fouling was observed.

Discharge Stability

An A4-size chart including solid parts having an area ratio of 5% per color, formed with MICROSOFT WORD 2000, was continuously printed on 200 sheets of MY PAPER (available from Ricoh Co., Ltd.). Discharge stability was evaluated based on the degree of disturbance in discharge at each nozzle after the continuous printing. The printing mode "Plain paper/Standard/Fast" was modified to "No color correction" through the user setting for plain paper using a driver attached to the printer.

Evaluation Criteria

A: Disturbance in discharge was not observed.
B: Disturbance in discharge was slightly observed.
C: Disturbance in discharge was observed, or discharge was not performed in part.

The evaluation results for Examples 1-19 and Comparative Examples 1-13 are shown in Table 2.

TABLE 2

|  | Resin | | | | Storage Stability | | Rub Resistance | | |
| --- | --- | --- | --- | --- | --- | --- | --- | --- | --- |
|  | Solvent Amount (%) | Particle Diameter (nm) | Solvent/Resin Ratio | Viscosity (mPa · s) | Change in Viscosity (%) | Evaluation Result | Image Peel-off | Fouling in Non-printed Part | Discharge Stability |
| Example 1 | 36.1 | 35 | 1.0 | 7.8 | 0.5 | A | A | A | A |
| Example 2 | 35.5 | 17 | 1.0 | 8.0 | −0.5 | A | A | A | A |
| Example 3 | 36.1 | 25 | 1.0 | 8.2 | 0.7 | A | A | A | A |
| Example 4 | 36.1 | 17 | 0.5 | 8.3 | −1.0 | A | A | A | A |
| Example 5 | 35.1 | 17 | 4.0 | 7.8 | 1.8 | A | A | A | A |
| Example 6 | 36.1 | 17 | 4.0 | 7.8 | 2.0 | A | A | A | A |
| Example 7 | 36.1 | 17 | 5.0 | 8.0 | 4.0 | A | A | A | B |
| Example 8 | 36.1 | 17 | 6.0 | 8.0 | 5.5 | B | A | A | B |
| Example 9 | 35.1 | 17 | 2.0 | 8.3 | 0.1 | A | A | A | A |
| Example 10 | 33.1 | 17 | 0.3 | 7.8 | −1.1 | A | A | A | A |
| Example 11 | 41.5 | 25 | 1.0 | 8.0 | 0.5 | A | A | A | A |
| Example 12 | 36.1 | 17 | 0.7 | 7.8 | 0.2 | A | A | A | A |
| Example 13 | 35.1 | 25 | 2.0 | 8.3 | −0.5 | A | A | A | A |
| Example 14 | 36.1 | 17 | 1.0 | 8.0 | −1.0 | A | A | A | A |
| Example 15 | 30.1 | 25 | 1.0 | 8.0 | 0.5 | A | A | A | A |
| Example 16 | 35.1 | 17 | 0.7 | 8.0 | −1.1 | A | A | A | A |
| Example 17 | 36.1 | 25 | 0.7 | 8.0 | 1.0 | A | A | A | A |
| Example 18 | 30.1 | 17 | 1.0 | 8.0 | 2.5 | A | A | A | A |
| Example 19 | 36.1 | 35 | 1.0 | 7.9 | 0.3 | A | A | A | A |
| Comparative Example 1 | 36.1 | — | — | 8.0 | 1.0 | A | C | C | A |
| Comparative Example 2 | 35.5 | 35 | 0.0 | 8.1 | 2.0 | A | B | A | A |
| Comparative Example 3 | 35.1 | 17 | 0.0 | 8.1 | −18.0 | C | A | A | A |
| Comparative Example 4 | 35.1 | 25 | 0.0 | 7.2 | −8.0 | C | A | A | A |
| Comparative Example 5 | 38.1 | 25 | 0.0 | 8.0 | −12.0 | C | A | A | A |
| Comparative Example 6 | 37.1 | 17 | 0.0 | 8.0 | −16.2 | C | A | A | A |
| Comparative Example 7 | 36.1 | 25 | 0.0 | 8.0 | −12.1 | C | A | A | A |
| Comparative Example 8 | 30.1 | 25 | 0.0 | 8.0 | −9.2 | C | A | A | A |
| Comparative Example 9 | 35.1 | 17 | 0.0 | 8.0 | −20.5 | C | A | A | A |
| Comparative Example 10 | 35.6 | 25 | 0.0 | 8.0 | −18.2 | C | A | A | A |
| Comparative Example 11 | 30.1 | 95 | 0.0 | 8.0 | 2.8 | A | C | C | A |
| Comparative Example 12 | 35.1 | 9 | 0.0 | 10.5 | 0.5 | A | C | C | A |
| Comparative Example 13 | 35.1 | 160 | 0.0 | 8.1 | 2.2 | A | C | C | A |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An inkjet ink comprising:
   an organic solvent comprising at least one of 3-methoxy-1-butanol and 3-methoxy-1-propanol;
   a pigment;
   a polyurethane particle having a particle diameter D50 of 50 nm or less; and
   water.

2. The inkjet ink of claim 1, wherein the particle diameter D50 ranges from 10 to 50 nm.

3. The inkjet ink of claim 1, wherein the at least one of 3-methoxy-1-butanol and 3-methoxy-1-propanol accounts for 0.8% to 12% by mass of the inkjet ink.

4. The inkjet ink of claim 1, wherein a mass ratio of the at least one of 3-methoxy-1-butanol and 3-methoxy-1-propanol to the polyurethane particle ranges from 0.2 to 5.0.

5. An ink container comprising:
   a container; and
   the inkjet ink of claim 1 contained in the container.

6. An inkjet recording apparatus comprising:
   the inkjet ink container of claim 5; and
   a recording head to discharge the inkjet ink.

7. The inkjet ink of claim 1, further comprising at least one surfactant selected from silicone-based surfactants, fluorine-based surfactants, ampholytic surfactants, nonionic surfactants, and anionic surfactants.

8. A recording method, comprising discharging droplets of the inkjet ink of claim 1 from an inkjet head onto a recording medium.

9. The recording method of claim 8, wherein the recording medium is a coated paper.

10. The recording method of claim 8, wherein the droplets have a volume of from 3 to 40 μL.

11. The inkjet ink of claim 1, wherein the organic solvent comprises 3-methoxy-1-butanol.

12. The inkjet ink of claim 1, wherein the organic solvent comprises 3-methoxy-1-propanol.

13. The inkjet ink of claim 1, wherein the organic solvent comprises 3-methoxy-1-butanol and 3-methoxy-1-propanol.

14. The inkjet ink of claim 1, wherein the ink has a viscosity of 5 to 15 mPa·s at 25° C.

* * * * *